United States Patent
Jeremko

[11] Patent Number: 5,922,423
[45] Date of Patent: Jul. 13, 1999

[54] ONE-PIECE REMOVABLE CORE TO SUPPORT A HOLLOW ELASTIC MEMBER IN A STRETCHED STATE

[76] Inventor: Daniel L. Jeremko, 478 E. Hyerdale Dr., Woodridge Lake Goshen, Conn. 06756

[21] Appl. No.: 08/846,838

[22] Filed: May 1, 1997

Related U.S. Application Data

[60] Provisional application No. 60/016,850, May 3, 1996.

[51] Int. Cl.⁶ ............................. B65B 53/00; F16L 9/22
[52] U.S. Cl. ..................... 428/34.9; 428/35.1; 428/35.5; 428/36.9; 428/913; 174/137 R; 174/DIG. 8; 138/99; 138/103; 138/155
[58] Field of Search ................... 428/34.9, 35.1, 428/913, 35.5, 36.9; 174/74 A, 74 R, 93, 84 R, 85, DIG. 8, 137 R; 138/99, 103, 155

[56] References Cited

U.S. PATENT DOCUMENTS

| | | |
|---|---|---|
| 4,389,440 | 6/1983 | Keith ........................................ 428/34.9 |
| 4,806,402 | 2/1989 | Vidakovits ............................. 428/34.9 |
| 4,871,599 | 10/1989 | Knorr ..................................... 428/34.9 |
| 5,087,492 | 2/1992 | Vallauri et al. ......................... 428/34.9 |
| 5,098,752 | 3/1992 | Chang et al. ........................... 428/34.9 |
| 5,171,940 | 12/1992 | Vallauri ................................. 174/73.1 |
| 5,271,975 | 12/1993 | Solano ................................... 428/35.1 |
| 5,373,616 | 12/1994 | Biersdorf et al. ......................... 29/235 |
| 5,406,871 | 4/1995 | Lambert ................................. 138/103 |
| 5,486,388 | 1/1996 | Portas et al. ........................... 428/34.9 |
| 5,492,740 | 2/1996 | Vallauri et al. ......................... 428/34.9 |
| 5,560,969 | 10/1996 | Portas .................................... 428/34.9 |

FOREIGN PATENT DOCUMENTS

WO 96/24977  8/1996  WIPO .

Primary Examiner—Rena L. Dye

[57] ABSTRACT

In a core assembly, a stretchable sleeve capable of recovering toward an initial unstretched configuration is supported on a hollow core. The core includes a plurality of structural elements connected by a plurality of linking elements that extend transversely of the structural elements. A mechanism is provided and connected to the distal end of the core whereby the core can be withdrawn from the sleeve in its axial direction by manipulating the mechanism allowing the sleeve to return to the initial unstretched configuration.

12 Claims, 7 Drawing Sheets

ONE-PIECE REMOVABLE CORE TO SUPPORT A HOLLOW ELASTIC MEMBER IN A STRETCHED STATE

CROSS-REFERENCE TO RELATED APPLICATIONS

This application is a complete application filed pursuant to a Provisional patent application Ser. No. 60/016,850 filed May 3, 1996 by the same inventor and having the same title, which is now abandoned. That Provisional Application is herein incorporated by reference.

FIELD OF THE INVENTION

This invention relates generally to cores for supporting stretched elastic sleeves, the core being removable from the sleeve to allow the sleeve to return to an unstretched condition thereby causing the sleeve to sealingly engage any underlying items.

BACKGROUND OF THE INVENTION

The present invention while having many uses, is particularly well suited for use in sealing cable connections of the type used in the power distribution industry and is described for convenience herein as directed to such use.

In known core/sleeve assemblies, an insulating elastic sleeve is adapted to be supported on the core, and the core itself comprises a one-piece plastic ribbon which is spirally formed in the shape of a cylinder. This type of assembly is typically referred to by those skilled in the art, as "cold shrink" tubing to differentiate it from polymeric tubing that may be shrunk by the application of heat. In a typical cable splice to be sealed using the core/sleeve assembly described above, two cable ends are connected and the cold shrink tube assembly is slid into position over the cable splice area. The core is then removed, thereby permitting the sleeve to contract, and form a tight fit around the cable splice. In an alternate embodiment, the core itself is generally of a tubular configuration and has a helical groove cut along its entire length. This helical groove permits the core to be spirally unwound from under the sleeve in a continuous strip which is removed through an annular interior area formed between the core and the cable. The sleeve which had initially been radially extended or stretched over the core, returns to the unstretched position as the strip is progressively withdrawn, thereby causing the core to contract around the cable to form a closely conforming, frictionally retained protective covering.

Although, this prior art construction has been used effectively for many years, substantial savings could be realized if the amount of material used for the core can be reduced without compromising its strength, that is, its ability to withstand the compressive forces imposed on it by the elasticity of the sleeve. Further savings results from one-step manufacturing operation, e.g. molding. Accordingly, it is the general object of the present invention to provide a core assembly for supporting a sleeve, that is both light weight and has sufficient structural integrity to retain the sleeve in a stretched configuration. Another object is to provide for such a core to be progressively withdrawable in its axial direction. These objects can be achieved while avoiding the disadvantages of the spiral cores, which are subject to unraveling when accidentally impacted. Another advantage of the present invention is that disposal problems with spirally unwound cores are reduced and potentially eliminated when the present invention is designed to be reusable.

SUMMARY OF THE INVENTION

The present invention provides a cold shrink sleeve and core assembly in which a stretchable sleeve is provided on a molded polymeric core capable of supporting the sleeve in its stretched configuration around a cable splice or other item that needs to be covered by the sleeve. The core is hollow so as to loosely accommodate cable connections or the like, and includes an axis coincident with the axis of the cable and its connections. In accordance with the present invention, the core also includes a discontinuous peripherally extending surface that is defined by a plurality of structural elements or rings substantially perpendicular to, and spaced along a longitudinally extending axis of the core, the peripherally extending surface being further defined by a plurality of longitudinally extending linking elements interposed between and in communication with the structural elements. The linking elements preferably include areas of weakness to facilitate folding or bending of these elements in a collapsing mode. The aforementioned elastic sleeve is supported in a stretched condition by the discontinuous peripherally extending surface of the core. Finally, means for manipulating the core are provided at a distal end of the core that are bendable and of sufficient length to be extended through the hollow core's interior and grasped for manipulation at its proximal end, resulting in the progressive withdrawal of the core in a generally axial direction, thereby allowing the sleeve to return to an unstretched configuration, whereby it assumes an intimate and sealing engagement between itself, the cable, and the cable connections provided inside the assembly.

BRIEF DESCRIPTION OF THE DRAWINGS

The present invention will be more particularly described with respect to the following drawings wherein like numbers refer to like parts in the several views and wherein.

DESCRIPTION OF THE PREFERRED EMBODIMENT

Figure 1:
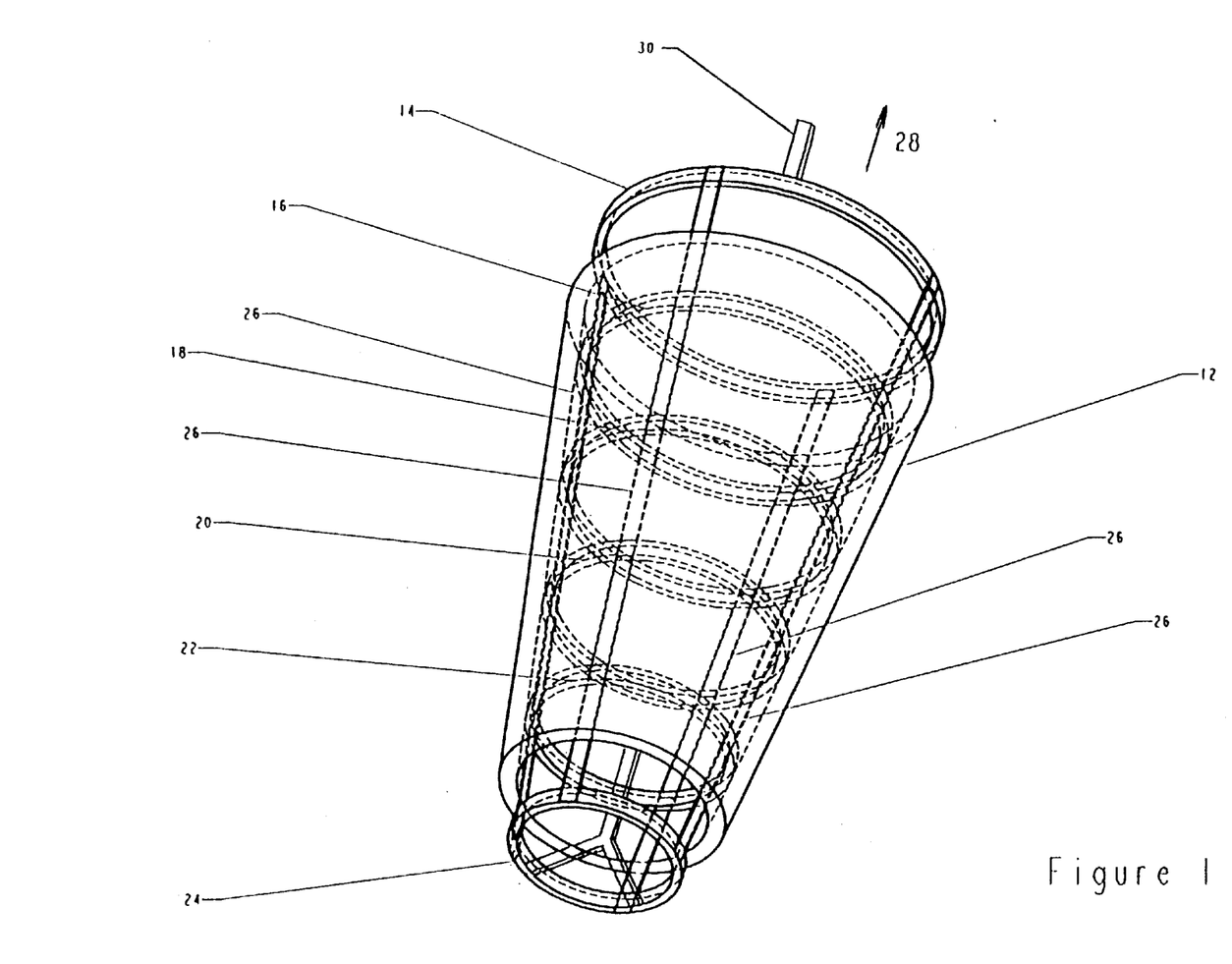
FIG. 1 is a perspective view of a conical core constructed in accordance with the present invention, the sleeve being depicted in assembled relation with the core.
Figure 2:
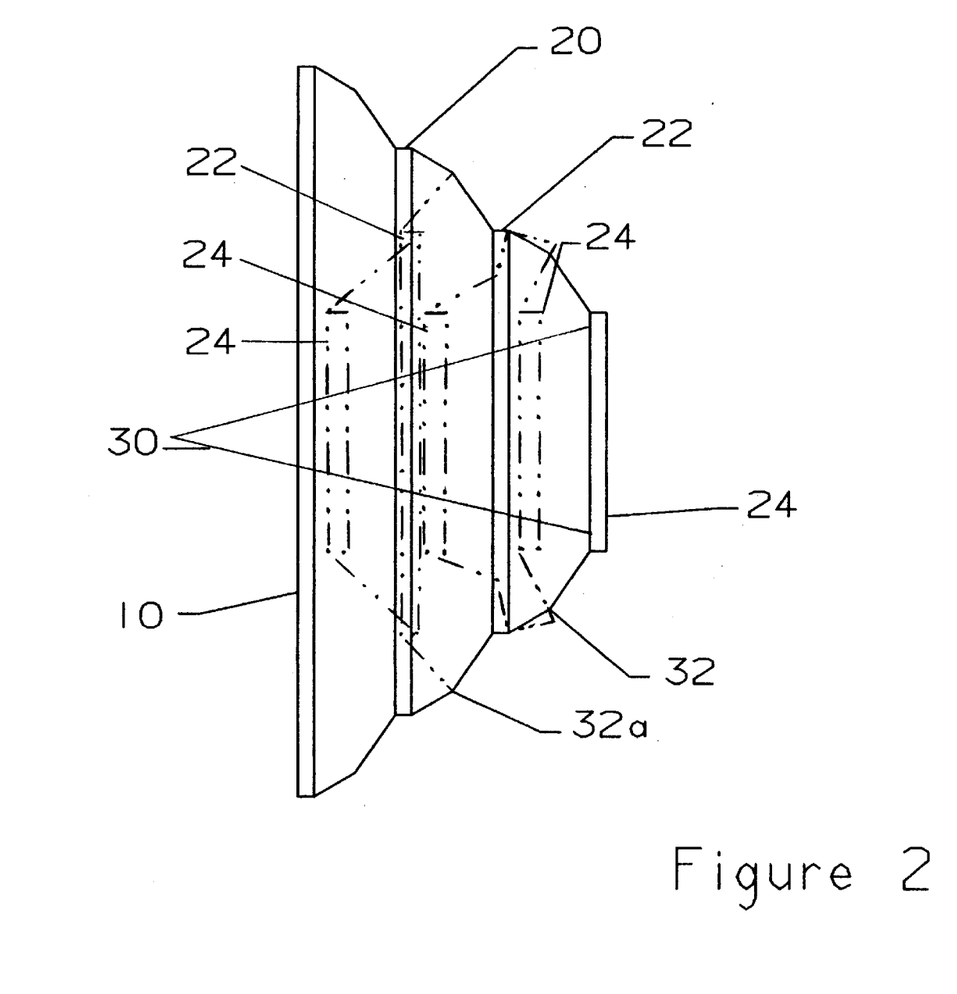
FIG. 2 is a schematic view illustrating the withdrawal mode of a conical core, showing the first four rings of the core and three progressive positions of ring one.

FIGS. 1 and 2 illustrate a core 10 of the present invention such as is adapted to be used with a conventional elastomeric tube or sleeve of the type which is usually shrunk onto a cable or cable connections or the like provided in a hollow interior defined by the core.

The cable cover assembly of the present invention includes an elastomeric tube or sleeve 12 which is in its stretched configuration as shown in FIGS. 1 and 2, but which is capable of recovering toward or assuming a less stretched or initial configuration such that upon removal of the core, it can be shrunk radially onto the underlying cable or cable connections to be sealed. While the present invention is described as being used in connection with sealing a cable splice, it is not limited in this regard as the present invention can find utility in other applications, such as, but not limited to installing grips on handles such as bicycle handle bars for example.

The core 10 comprises a plurality of structural elements or annular rings 14, 16, 18, 20, 22 and 24 each of decreasing diameter, held in the position shown for them in FIG. 1 by longitudinally extending linking elements 26, 26. As shown, four such elements 26, 26 are provided at diametrically opposed locations and are integrally connected to diametrically opposed locations at the interior edges of each of the rings. The core assembly 10 has a longitudinal axis generally coincident with the axis of the cable or cable connections to be sealed, and as also shown in FIG. 1, one or more manually manipulatable tensioning elements 30 attached to the smallest (distal) ring so as to permit pulling on the proximal end of the tensioning element 30 that has passed through the core, causing the core to be withdrawn progressively in the axial direction with the smallest ring 24 being pulled in the direction of the arrow 28 through the somewhat larger ring 22 and in turn pulling of that ring 22 along with the ring 24 through the next ring 20 until the core is turned inside out in much the same manner as the sleeve of a shirt might be pulled inside out.

In order to facilitate this turning inside out of the core, the longitudinal elements 26, 26 are preferably provided with areas or regions of weakness intermediate the annular rings so as to facilitate folding or bending of these element portions between the rings during the process of pulling one ring through another.

In the process of so pulling the smaller rings through the larger rings, the elastomeric tube or sleeve 12 will remain in the stretched position until it is no longer supported by the rings whereupon the elastomeric tube or sleeve will shrink radially inwardly toward the cable or cable connections to be sealed by it.

FIG. 2 schematically illustrates the axial collapsing of an extremely tapered conical core 10 as described above. The smaller ring 24 can be seen to move from the position shown in full lines to the position shown in broken lines as a result of the folding of each of the longitudinal linking elements at the weakened hinge points indicated generally at 32 in FIG. 2. Further pulling of the manually manipulated tensioning member 30 causes ring element 24 to assume the further positions illustrated for it in FIG. 2 wherein the fold points 32 actually straightens once again and a second folding region 32a is created between rings 22 and 20. As the smaller ring 24 is further pulled through the larger rings, it will be apparent that the second ring also assumes analogous positions as shown for it in FIG. 2 where ring 22 is passing through ring 20.

Figure 3:
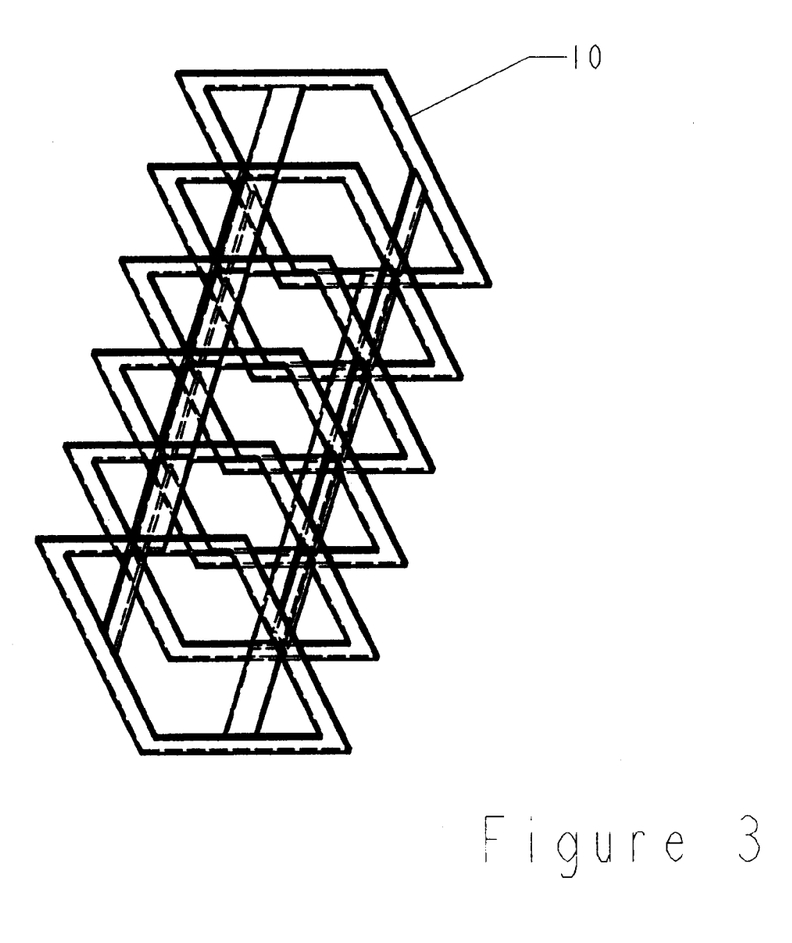
FIG. 3 is a perspective view of an alternate embodiment of the core of FIG. 1.

From the foregoing description and the drawings of the preferred embodiment, it will be apparent that other variations may occur to those skilled in the art. For example, ring shapes other than circular can be useful in certain applications. The rings may be elliptical or polygon shaped as shown in FIG. 3, or even irregularly shaped as desired.

Another variation might be to alter the longitudinal or straight center line axis of the preferred embodiment. For example, a curved sleeve provided over a curved cable connection can be readily fabricated by reason of injection molding a core of appropriate geometry designed for this purpose.

Figure 4:
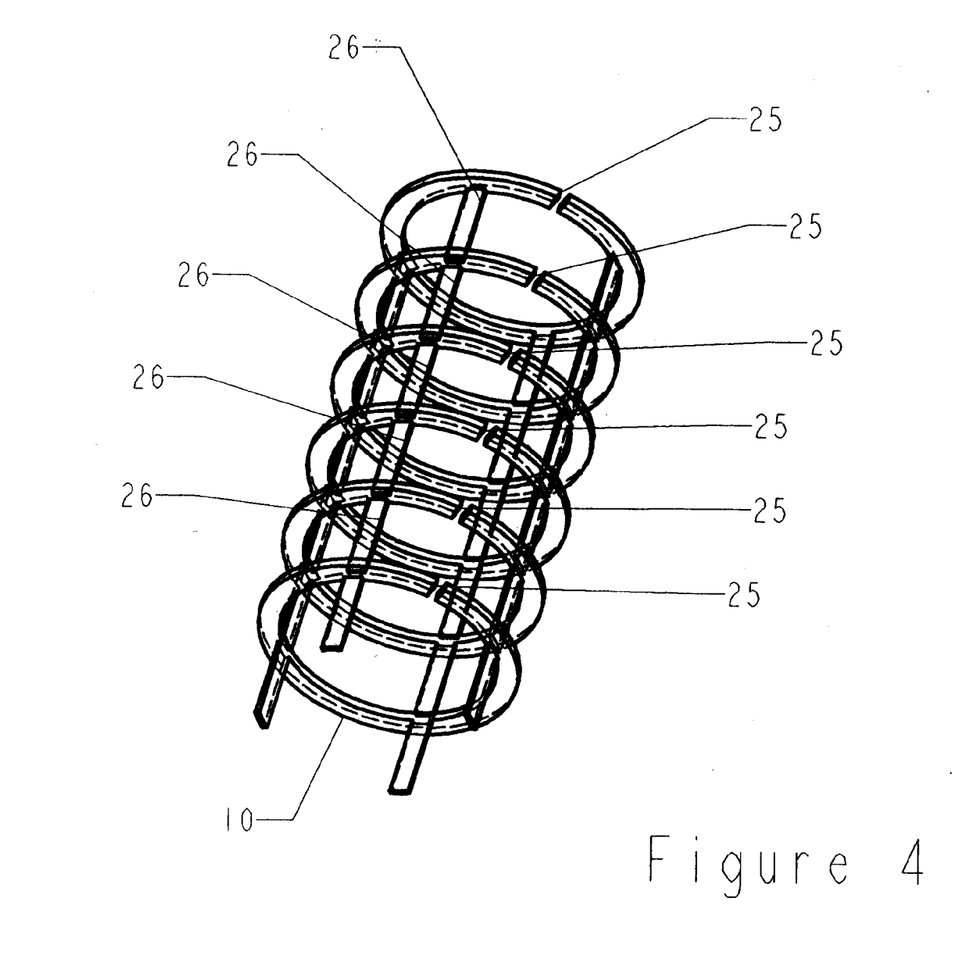
FIG. 4 is a perspective view of an alternate embodiment of the core of FIG. 1, having split rings for easy removal of the core.

Still another variation would be to provide lockable (and unlockable) gaps 25 in each of the rings, preferably along a common lateral line such as that adjacent to one of the linking elements 26, as shown in FIG. 4. This feature would permit the core to be readily removed from the cable after being turned inside out in the manner described above.

Figure 5:
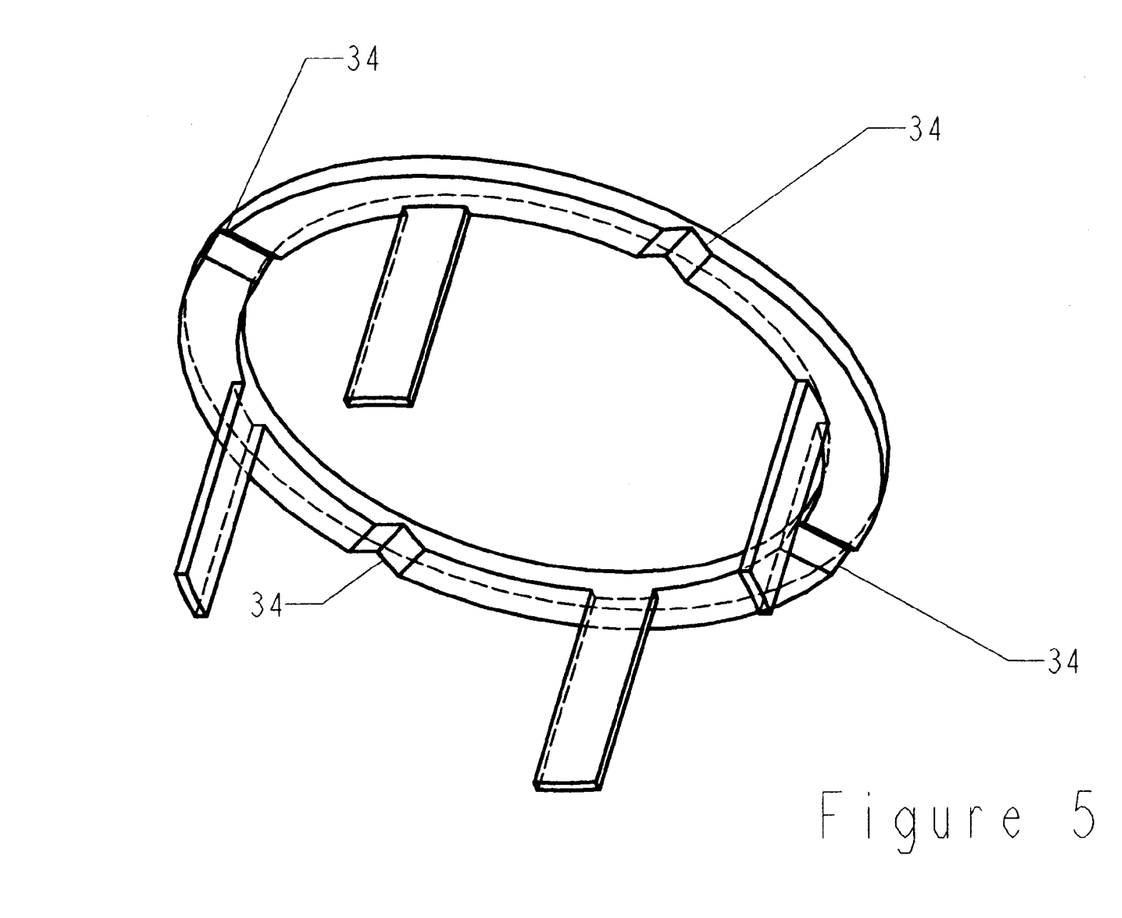
FIG. 5 is a perspective view of an alternate embodiment of a portion of the core of FIG. 1 showing areas of weakness in a round ring.

Still another variation shown in FIG. 5 would be to provide a generally cylindrical core with the above-described axial withdrawal accomplished as a result of providing areas of weakness 34 in the rings themselves to facilitate ring deformation to permit passing of the rings one through another even though they be of the same diameter. (See FIG. 7)

Figure 6:
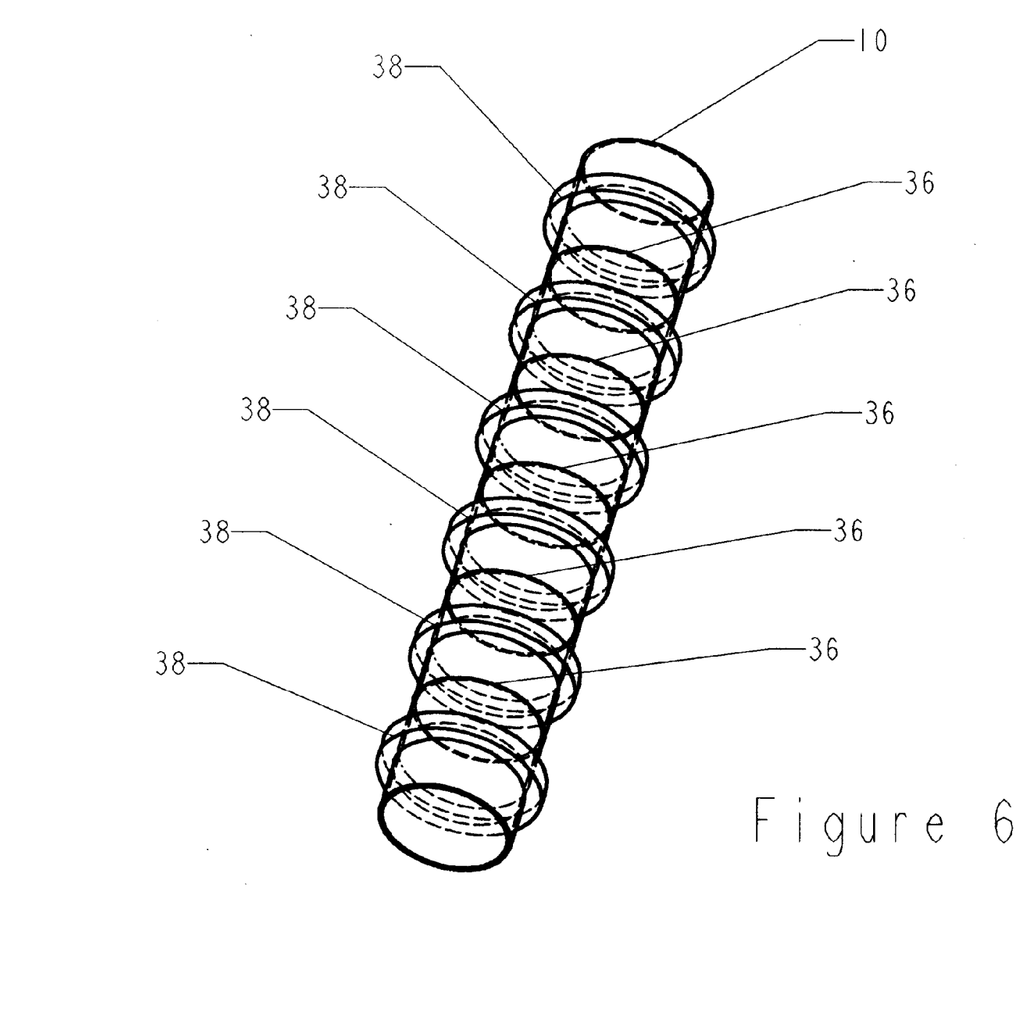
FIG. 6 is a perspective view of an alternate embodiment of the core of FIG. 1, having linking elements that are continuous rather than discontinuous.

In yet another embodiment of the present invention shown in FIG. 6, the linking elements are not discontinuous, but are comprised of thinly molded polymeric cylindrical sections 36 interposed between, and in communication with the structural elements 38, such that when the manually manipulated tensioning member 30 is pulled, the polymeric cylindrical sections collapse in on themselves allowing successive structural elements to be pulled through adjacent structural elements in the manner described above.

Figure 7:
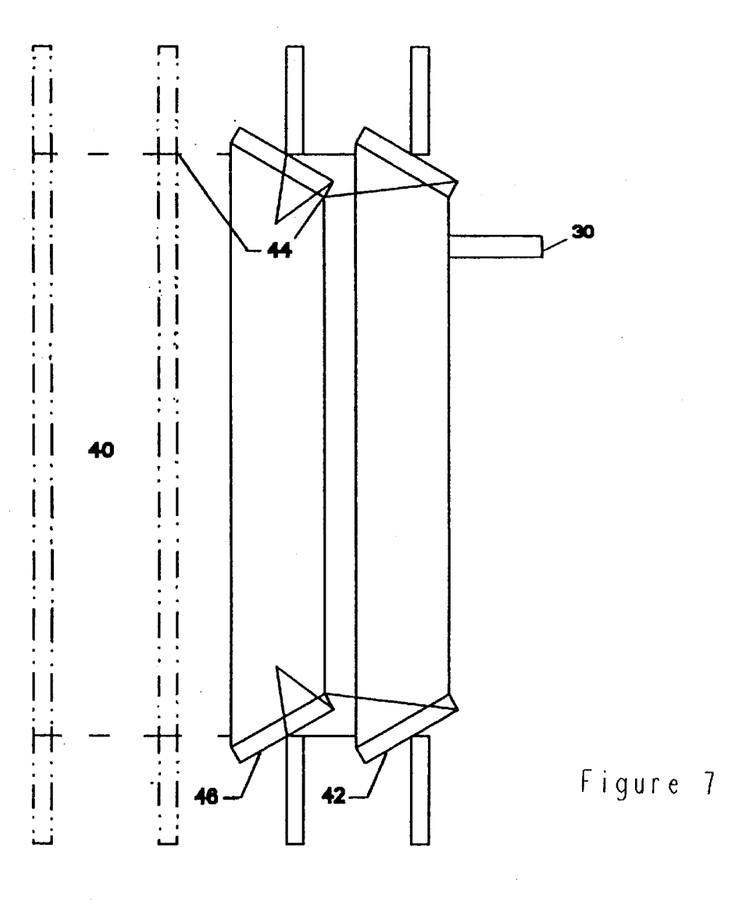
FIG. 7 is a schematic view illustrating the withdrawal mode of an alternate embodiment of the core of FIG. 1.

Referring to FIG. 7, the withdrawal mode of a core comprising a series of equally sized rings is illustrated. As the manipulation means 30 is pulled through the core's hollow interior 40, the outermost or distal ring 42 is pulled through the inner diameter 44 of the adjacent ring 46. This process continues until the core is essentially pulled inside out, thereby allowing the elastic sleeve (not shown) to progressively collapse.

While preferred embodiments have been shown and described, various modifications and substitutions may be made without departing from the spirit and scope of the present invention. Accordingly, it is to be understood that the present invention has been described by way of example and not by limitation.

What is claimed is:

1. A core assembly for supporting a sleeve comprising:
    a stretchable sleeve capable of recovering toward an unstretched initial configuration;
    a core defining a hollow interior area having a longitudinally extending axis and a discontinuous peripherally extending surface defined by a plurality of structural elements substantially perpendicular to and spaced along the longitudinally extending axis, the peripherally extending surface being further defined by a plurality of longitudinally extending, bendable, linking elements interposed between and in communication with the structural elements;
    the stretchable sleeve being supported in a stretched condition by the discontinuous peripherally extending surface; and
    one or more manually manipulatable tensioning elements connected to a distal end of the core and extendable through the hollow interior area of the core for manipulation at a proximal end of the core to be withdrawn in an axial direction, thereby allowing the core to be removed and the stretchable sleeve to recover toward its unstretched initial configuration.

2. A core assembly for supporting a sleeve as defined by claim 1, wherein the plurality of structural elements comprise generally ring shaped elements each defining an inner and an outer diameter, such that when the manually manipulatable tensioning elements connected to a distal end of the core are manipulated, the ring positioned at the distal end is pulled toward the proximal end, the outer diameter of each ring passing through the inner diameter of each adjacent ring thereby causing the core to be withdrawn progressively in the axial direction.

3. A core assembly for supporting a sleeve as defined by claim 1, wherein the linking elements comprise a plurality of circumaxially spaced legs having weakened areas that define hinge points for the legs.

4. A core assembly for supporting a sleeve as defined by claim 1, wherein the plurality of structural elements comprise generally ring shaped components each defining an outer and inner diameter increasing from the distal to the proximal end of the core.

5. A core assembly for supporting a sleeve as defined by claim 1, wherein:
the plurality of structural elements are substantially planar relative to each other; and wherein
each of the structural elements includes weakened areas defining hinged portions that allow the structural elements to deform and assume a non-planar configuration relative to an adjacent structural element when the manually manipulatable tensioning elements connected to a distal end of the core are so manipulated.

6. A core assembly for supporting a sleeve as defined by claim 1 wherein the structural elements are of polygon shape.

7. A core assembly for supporting a sleeve as defined by claim 1, wherein the plurality of structural elements comprise a plurality of lockable and unlockable split rings, whereby the withdrawn core can be more readily removed from around a cable structure provided inside the core assemblies.

8. A core assembly for supporting a sleeve as defined by claim 1, wherein the plurality of structural elements, the plurality of linking elements, and the manually manipulatable tensioning elements connected to a distal end of the core are polymeric.

9. A core assembly for supporting a sleeve as defined by claim 1, wherein the plurality of structural elements and the plurality of linking elements, and the manually manipulatable tensioning elements are molded integrally.

10. A core assembly for supporting a sleeve as defined by claim 1, wherein the linking elements comprise a plurality of rings having the same outer diameter.

11. A core assembly for supporting a sleeve as defined by claim 1, wherein the longitudinally extending axis is curved or is angled.

12. A core assembly as defined in claim 1, wherein the linking elements comprise a plurality of cylindrical polymeric sections interposed between and in communication with the structural elements, such that when the manually manipulatable tensioning elements connected to a distal end of the core are manipulated, the cylindrical sections collapse in on themselves.

* * * * *